Patented Jan. 25, 1944

2,340,137

UNITED STATES PATENT OFFICE 2,340,137

DIBROMDITHIOCYANOETHANE AS A SEED DISINFECTANT

William Moore, Stamford, Conn., assignor to American Cyanamid Company, New York, N. Y., a corporation of Maine No Drawing. Application December 29, 1942, Serial No. 470,496

3 Claims. (Cl. 167—38)

The present invention relates to a seed disinfectant, and more particularly to an organic compound which is highly effective in controlling diseases of seed grain.

I have discovered that 1,2-dibromo-1,2-dithiocyanoethane is an effective agent for the protection of seeds and seedlings from seed-borne and soil-borne organisms which cause seed rot, seedling blight and damping-off. It has been found particularly effective in controlling such systemic organisms as bunt of wheat and smut of oats.

The above compound may be prepared by reacting bromine and 1,2-dithiocyanoethylene together as follows:

46 parts of 1,2-dithiocyanoethylene and 62 parts of bromine by weight are placed in a round glass-stoppered vessel partly filled with glass beads. The vessel is rotated for about 16 hours on a roller device. The crude crystalline product is treated with hot benzene and filtered. After concentrating and cooling the benzene solution, the 1,2-dibromo-1,2-dithiocyanoethane is obtained as a fine crystalline product melting at 105–110° C.

Seed corn highly infected with *Diplodia zeae* was dusted with a mixture consisting of equal parts of 1,2-dibromo-1,2-dithiocyanoethane and talc in the proportion of 1.5 ounces of dust per bushel of corn. Excellent control of the root rot organism was obtained. Saprophytic fungi such as *Aspergillus niger*, *Rhizopus nigricans* and *Penicillium sp.* present on the corn seed were also controlled by this treatment.

A dust consisting of equal parts of 1,2-dibromo-1,2-dithiocyanoethane and talc was found well adapted for the treatment of heavily smutted Anthony oat seed in the proportion of two ounces of dust to a bushel of the grain.

A highly effective control of bunt of spring wheat was obtained using a dust consisting of equal parts of 1,2-dibromo-1,2-dithiocyanoethane and talc applied in the proportion of one ounce of dust per bushel of wheat.

Although 1,2-dibromo-1,2-dithiocyanoethane may be used alone as a seed disinfectant, it is usually preferable to mix it with inert fillers or spreading materials such as talc, bentonite, fuller's earth, pumice, silica, silicates, chalk, and the like. The proportion of the seed disinfectant to the inert material in the prepared dust may be varied in accordance with the particular effects desired and the conditions under which it is to be used. Under some circumstances, it may be desirable and feasible to apply the present compound in the form of a solution or suspension in a liquid, and the present invention does not preclude such use.

An important characteristic of the above compound is its low volatility which greatly contributes to its effectiveness in controlling seed-borne organisms.

While the invention has been described with particular reference to specific embodiments, it is to be understood that it is not to be limited thereto but is to be construed broadly and restricted solely by the scope of the appended claims.

What is claimed is:

1. A method of controlling organisms carried by seeds which includes applying thereto a toxic quantity of 1,2-dibromo-1,2-dithiocyanoethane.

2. A seed disinfectant including a toxic amount of 1,2-dibromo-1,2-dithiocyanoethane.

3. A composition for disinfecting seeds comprising substantially equal parts of 1,2-dibromo-1,2-dithiocyanoethane and an inert material.

WILLIAM MOORE.